(12) United States Patent
Nishiwaki et al.

(10) Patent No.: US 10,383,064 B2
(45) Date of Patent: Aug. 13, 2019

(54) INTER-VEHICLE COMMUNICATION DEVICE

(71) Applicant: Mitsubishi Electric Corporation, Tokyo (JP)

(72) Inventors: Takeshi Nishiwaki, Tokyo (JP); Takashi Maeda, Tokyo (JP); Keisuke Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/989,654

(22) Filed: May 25, 2018

(65) Prior Publication Data

US 2019/0200302 A1    Jun. 27, 2019

(30) Foreign Application Priority Data

Dec. 26, 2017    (JP) ................ 2017-248920

(51) Int. Cl.
*H04W 52/28*    (2009.01)
*H04W 52/38*    (2009.01)
*H04W 4/02*    (2018.01)
*H04W 4/46*    (2018.01)

(52) U.S. Cl.
CPC ......... *H04W 52/282* (2013.01); *H04W 4/026* (2013.01); *H04W 4/46* (2018.02); *H04W 52/383* (2013.01)

(58) Field of Classification Search
CPC ....... H04W 4/46; H04W 4/025; H04W 4/026; H04W 4/027; H04W 52/282; H04W 52/383
See application file for complete search history.

(56) References Cited

U.S. PATENT DOCUMENTS

2015/0348412 A1* 12/2015 Onishi ............ G08G 1/096791
340/905

FOREIGN PATENT DOCUMENTS

JP    4096809 B2    6/2008

* cited by examiner

*Primary Examiner* — Keith Ferguson
(74) *Attorney, Agent, or Firm* — Sughrue Mion, PLLC; Richard C. Turner

(57) ABSTRACT

The processing circuit of an inter-vehicle communication device includes a transmission output correction table in which a transmission power value or a corrected transmission power value in accordance with propagation characteristics of radio waves transmitted from an own vehicle is set to correspond to a region with coordinates having a direction of travel of the own vehicle as an axis. The processing circuit acquires a transmission power value or a corrected transmission power value corresponding to relative position coordinates of a peripheral vehicle from the transmission output correction table, and determines transmission power for when transmitting own vehicle travelling information to the peripheral vehicle. Because of this, communication with the peripheral vehicle positioned in a region in which radio wave propagation characteristics are sparse can be reliably established, and communication congestion can be avoided.

9 Claims, 5 Drawing Sheets

INTER-VEHICLE COMMUNICATION DEVICE

BACKGROUND OF THE INVENTION

Field of the Invention

The present invention relates to an inter-vehicle communication device for wireless communication between travelling vehicles.

Description of the Background Art

A communication system wherein travelling information such as a current position and direction of travel of vehicles is exchanged, using inter-vehicle communication that utilizes a communication terminal mounted in each vehicle, has been provided in recent years. A driver can ascertain a condition of a peripheral vehicle by regularly receiving these items of information, because of which a traffic accident caused by a misunderstanding or the like can be prevented.

The heretofore described kind of inter-vehicle communication is such that when a density of vehicles travelling on a road increases, communication traffic between vehicles increases, and communication congestion occurs. When congestion occurs, a probability of neighboring vehicles impeding each other's data communication increases, and communication quality may deteriorate noticeably.

Restricting transmission power of radio waves used in inter-vehicle communication to a necessary and sufficient amount of transmission power is effective as a method of reducing the probability of neighboring vehicles impeding each other's data communication. As existing technology relating to inter-vehicle communication transmission power control, radio wave transmission power is regulated in accordance with vehicle travelling speed in Patent Document 1. This existing technology is such that when an own vehicle speed increases, transmission power is increased so that communication with a distanced vehicle can be carried out, and when moving slowly or stopped, transmission power is reduced to a level such that communication with a nearby vehicle can be carried out one-on-one, thereby avoiding an occurrence of congestion.

[Patent Document 1] Japanese Patent No. 4,096,809

Radio waves transmitted from an antenna of an inter-vehicle communication device interfere with radio waves that arrive late due to reflection or diffraction during a process of being transmitted through a space, and a distribution of a region of weak radio waves and a region of strong radio waves, that is, an electrical field intensity distribution, occurs. Because of this, propagation characteristics of radio waves transmitted from a vehicle are not uniform, and a dense region and a sparse region exist according to a vehicle form, an antenna position, and the like. Consequently, when carrying out transmission power control with consideration only to an increase or decrease in vehicle travelling speed, as is the case with the existing technology, communication with a vehicle positioned in a region in which radio wave propagation characteristics are sparse may not be established.

Meanwhile, the existing technology is such that when transmission power at each travelling speed is set high to such an extent that communication with a vehicle positioned in a region in which radio wave propagation characteristics are sparse is established, transmission power is set higher than necessary in a region in which radio wave propagation characteristics are dense, and the advantage of avoiding an occurrence of congestion is not obtained. In this way, the existing inter-vehicle communication device has a problem in that a balance between reliably establishing communication with a peripheral vehicle and avoiding communication congestion is not achieved.

SUMMARY OF THE INVENTION

The invention, having been contrived in order to resolve the heretofore described kind of problem, has an object of providing an inter-vehicle communication device such that communication with a peripheral vehicle positioned in a region in which radio wave propagation characteristics are sparse can be reliably established, and communication congestion can be avoided.

An inter-vehicle communication device according to the invention is an inter-vehicle communication device mounted in a multiple of vehicles including an own vehicle and a peripheral vehicle and carrying out wireless communication between the own vehicle and the peripheral vehicle, the inter-vehicle communication device including a position detector that detects a current position and a direction of travel of the own vehicle, a transmitting device that transmits own vehicle travelling information including the current position and the direction of travel of the own vehicle output by the position detector to the peripheral vehicle, a receiving device that receives peripheral vehicle travelling information including a current position and a direction of travel of the peripheral vehicle, and a processing circuit having a transmission output correction table in which a transmission power value or a corrected transmission power value in accordance with propagation characteristics of radio waves transmitted from the own vehicle is set to correspond to a region with coordinates having the direction of travel of the own vehicle as an axis, wherein the processing circuit to obtain relative position coordinates of the peripheral vehicle among coordinates having the direction of travel of the own vehicle as an axis, based on the own vehicle travelling information and the peripheral vehicle travelling information, to record the relative position coordinates, to acquire a transmission power value or a corrected transmission power value corresponding to the relative position coordinates from the transmission output correction table, and to determine transmission power for when transmitting the own vehicle travelling information to the peripheral vehicle.

According to the inter-vehicle communication device according to the invention, the processing circuit has a transmission output correction table in which a transmission power value or a corrected transmission power value in accordance with propagation characteristics of radio waves transmitted from an own vehicle is set to correspond to a region with coordinates having a direction of travel of the own vehicle as an axis, and determines transmission power for when transmitting own vehicle travelling information to a peripheral vehicle based on the transmission output correction table, whereby communication with a peripheral vehicle positioned in a region in which radio wave propagation characteristics are sparse can be reliably established, and communication congestion can be avoided.

The foregoing and other objects, features, aspects and advantages of the invention will become more apparent from the following detailed description of the invention when taken in conjunction with the accompanying drawings.

DETAILED DESCRIPTION OF THE PREFERRED EMBODIMENTS

First Embodiment

Figure 1:
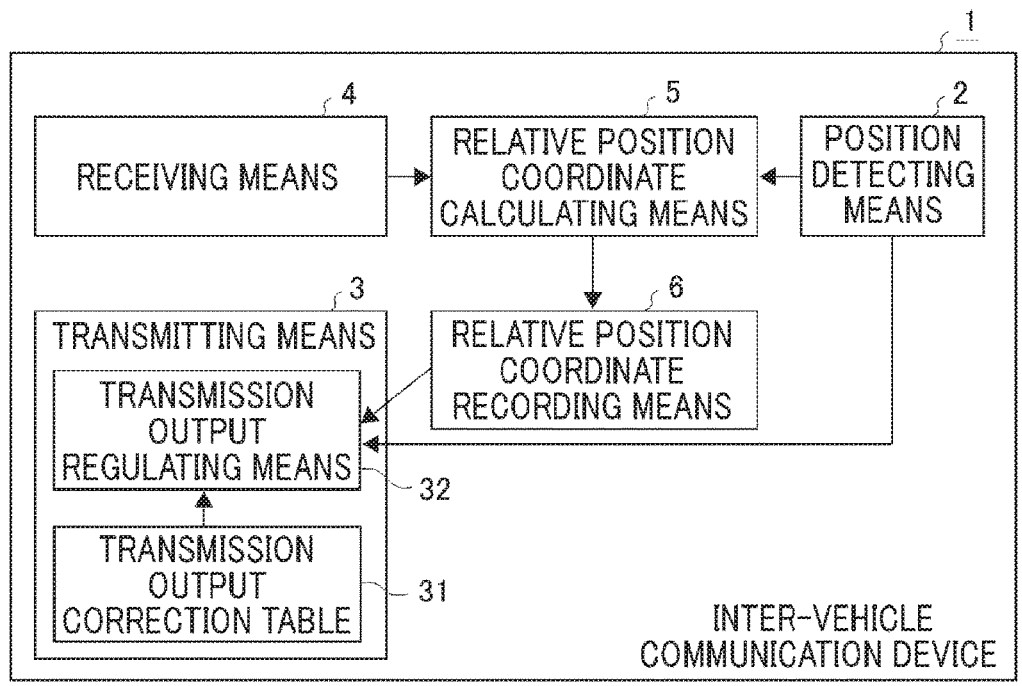
FIG. 1 is a functional block diagram showing an inter-vehicle communication device according to a first embodiment of the invention.
Figure 2:
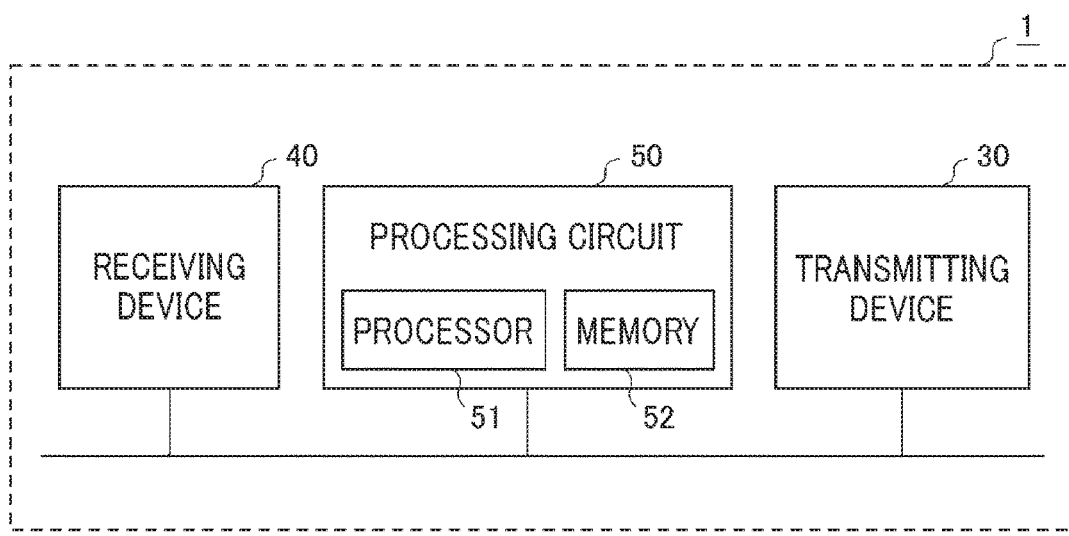
FIG. 2 is a hardware configuration diagram showing the inter-vehicle communication device according to the first embodiment of the invention.
Figure 3:
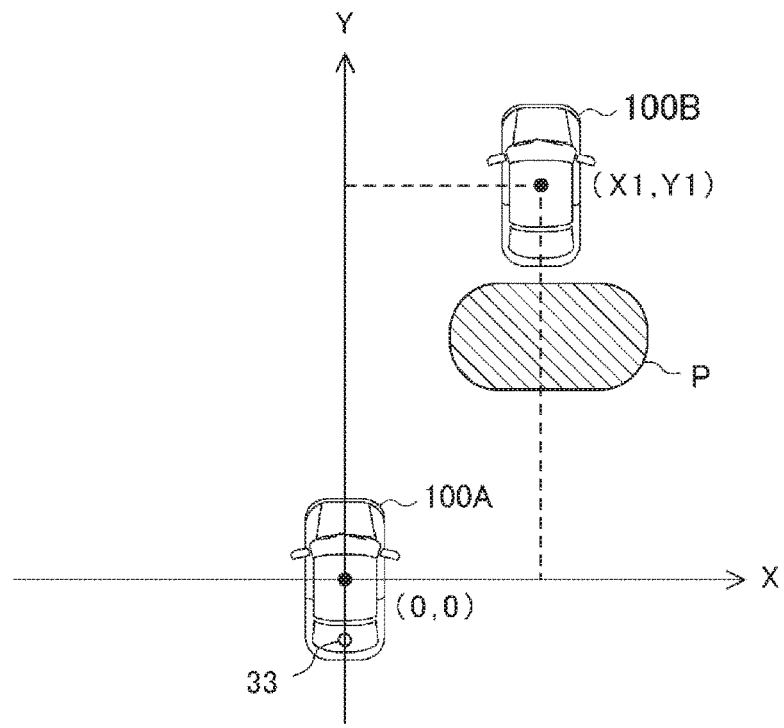
FIG. 3 is a diagram illustrating relative position coordinates of a peripheral vehicle as per the inter-vehicle communication device according to the first embodiment of the invention.

Hereafter, based on the drawings, an inter-vehicle communication device according to a first embodiment of the invention will be described. FIGS. 1 and 2 are a functional block diagram and a hardware configuration diagram showing the inter-vehicle communication device according to the first embodiment. Also, FIG. 3 is a diagram illustrating relative position coordinates of a peripheral vehicle as per the inter-vehicle communication device according to the first embodiment.

An inter-vehicle communication device 1 according to the first embodiment is mounted in a multiple of vehicles, including at least an own vehicle 100A and a peripheral vehicle 100B, and carries out wireless communication between the own vehicle 100A and the peripheral vehicle 100B. The peripheral vehicle 100B is a travelling vehicle neighboring the own vehicle 100A, and is mainly a vehicle directly in front or directly behind, but there is also a case in which a vehicle travelling in an opposite lane or a vehicle travelling on a separate neighboring road is included. The own vehicle 100A and the peripheral vehicle 100B are equal in that the inter-vehicle communication device 1 according to the first embodiment is mounted in both, and there is compatibility.

As shown in FIG. 1, the inter-vehicle communication device 1 includes position detecting means 2 as a position detector, transmitting means 3, receiving means 4, relative position coordinate calculating means 5, and relative position coordinate recording means 6. In the following description, the inter-vehicle communication device 1 mounted in the own vehicle 100A is given as an example, and functions thereof are described.

The position detecting means 2 detects a current position and a direction of travel of the own vehicle 100A. Specifically, the position detecting means 2 acquires data on the current position (latitude and longitude) and the direction of travel of the own vehicle 100A using a satellite positioning system such as a global positioning system (GPS), and outputs own vehicle travelling information including the data to the transmitting means 3 and the relative position coordinate calculating means 5.

The transmitting means 3 transmits the own vehicle travelling information including the current position and the direction of travel of the own vehicle 100A output by the position detecting means 2 to the peripheral vehicle 100B. The transmitting means 3 includes a transmission output correction table 31 and transmission output regulating means 32, and has a function of regulating transmission power when transmitting the own vehicle travelling information to the peripheral vehicle 100B. The transmission output correction table 31 and the transmission output regulating means 32 will be described in detail hereafter.

The receiving means 4 receives peripheral vehicle travelling information including a current position and a direction of travel of the peripheral vehicle 100B. The peripheral vehicle travelling information is transmitted from the transmitting means 3 of the peripheral vehicle 100B, and the current position and the direction of travel of the peripheral vehicle 100B included in the peripheral vehicle travelling information are detected by the position detecting means 2 of the inter-vehicle communication device 1 of the peripheral vehicle 100B. Every time the receiving means 4 receives the peripheral vehicle travelling information, the receiving means 4 outputs the peripheral vehicle travelling information to the relative position coordinate calculating means 5.

The relative position coordinate calculating means 5, based on the own vehicle travelling information and the peripheral vehicle travelling information, obtains relative position coordinates of the peripheral vehicle 100B among coordinates having the direction of travel of the own vehicle 100A as an axis. In the first embodiment, the relative position coordinate calculating means 5 calculates the relative position coordinates of the peripheral vehicle 100B, using the latitude and the longitude of the peripheral vehicle 100B received by the receiving means 4 and the latitude, the longitude, and the direction of travel of the own vehicle 100A detected by the position detecting means 2.

An example of coordinates having the direction of travel of the own vehicle 100A as an axis is shown in FIG. 3. In FIG. 3, a center of the own vehicle 100A is taken as an origin (0, 0), the direction of travel of the own vehicle 100A is taken as a Y axis, and a left-right direction is taken as an X axis. A transceiver antenna 33 installed in the own vehicle 100A may also be taken as an origin. The relative position coordinate calculating means 5 obtains relative position coordinates (X1, Y1) of the peripheral vehicle 100B among coordinates having the direction of travel of the own vehicle 100A as an axis.

The relative position coordinate recording means 6 sequentially records relative position coordinates of the peripheral vehicle 100B output by the relative position coordinate calculating means 5. When the number of recorded relative position coordinates exceeds a capacity, the relative position coordinate recording means 6 destroys relative position coordinates in order of oldest first, and records a new relative position coordinate. Also, the relative position coordinate recording means 6 can record relative position coordinates of a multiple of peripheral vehicles.

Also, as shown in FIG. 2, the functions of the inter-vehicle communication device 1 according to the first embodiment are realized by a transmitting device 30 acting as the transmitting means 3, a receiving device 40 acting as the receiving means 4, and a processing circuit 50 acting as the relative position coordinate calculating means 5, the relative position coordinate recording means 6, the transmission output correction table 31, and the transmission output regulating means 32. The processing circuit 50 has a processor 51 that reads and executes a program stored in a memory 52. The functions of the relative position coordinate calculating means 5 and the relative position coordinate recording means 6 and the functions of the transmission output correction table 31 and the transmission output regulating means 32 may be realized by separate processing circuits, or may be realized collectively. The memory 52 includes a volatile storage device, such as a random access memory, and a non-volatile auxiliary storage device such as a flash memory.

Also, when the processing circuit 50 is dedicated hardware, for example, a single circuit, a composite circuit, a programmed processor, an application-specific integrated circuit (ASIC), a field-programmable gate array (FPGA), or a combination of these, is applicable. The transmitting device 30 includes a wireless transmitting circuit having a modulator, a power amplifier, a transmission antenna, and the like. Also, the receiving device 40 includes a wireless receiving circuit having a receiving antenna, a high frequency amplifier, a high frequency mixer, a demodulator, and the like. The inter-vehicle communication device 1 according to the first embodiment includes the transceiver antenna 33, which doubles as a transmission antenna and a receiving antenna. The transceiver antenna 33 may be installed in one place, or installed in a multiple of places and used diversely.

Also, when a speed of the peripheral vehicle 100B is used when the relative position coordinate calculating means 5 obtains the relative position coordinates of the peripheral vehicle 100B (refer to a third embodiment), a vehicle speed sensor that detects vehicle speed from a pulse signal generated in proportion to an axle rotation speed can be used as speed detecting means 7 (refer to FIG. 9), in addition to the position detecting means 2 that utilizes a satellite positioning system. Existing products can be used as the position detecting means 2 and the speed detecting means 7, and can be used together with another application program, such as a satellite navigation system.

The transmission output correction table 31 and the transmission output regulating means 32 of the transmitting means 3 in the inter-vehicle communication device 1 according to the first embodiment will be described using FIGS. 3 to 6. Radio waves transmitted from the transceiver antenna 33 interfere with radio waves that arrive late due to reflection or diffraction during a process of being transmitted through a space, and a distribution of a region of weak radio waves and a region of strong radio waves, that is, an electrical field intensity distribution, occurs. Because of this, propagation characteristics of radio waves transmitted from the own vehicle 100A are not uniform, and a dense region and a sparse region exist.

When the peripheral vehicle 100B is positioned in a region P in which the radio wave propagation characteristics are sparse, at the coordinates shown in FIG. 3, there is a possibility that communication will not be established with a transmission power in accordance with an inter-vehicle distance. Although one region P in which the radio wave propagation characteristics are sparse is shown in FIG. 3, there is also a case in which a multiple of the region P exist.

The transmission output correction table 31 is such that a transmission power value or a corrected transmission power value in accordance with propagation characteristics of radio waves transmitted from the own vehicle 100A is set to correspond to a region with coordinates having the direction of travel of the own vehicle 100A as an axis. The transmission output regulating means 32 acquires the relative position coordinates of the peripheral vehicle 100B from the relative position coordinate recording means 6, acquires the transmission power value or the corrected transmission power value corresponding to the relative position coordinates from the transmission output correction table 31, and determines the transmission power for when transmitting the own vehicle travelling information to the peripheral vehicle 100B.

A necessary and sufficient transmission power value in accordance with a coordinate region, and a transmission power value corrected in accordance with radio wave characteristics, are set in the transmission output correction table 31. Alternatively, the transmission power value and the corrected transmission power value may be set as a correction factor with respect to a transmission power reference value. Propagation characteristics of radio waves transmitted from the own vehicle 100A are determined by a form of the own vehicle 100A, or a position of the transceiver antenna 33 and the like, and propagation characteristics of radio waves transmitted from the peripheral vehicle 100B are determined by a form of the peripheral vehicle 100B, or a position of a transceiver antenna and the like. Because of this, when vehicle types differ, or when vehicle types are the same but specifications such as antenna positions and quantities differ, differing transmission output correction tables 31 are provided.

Figure 4:
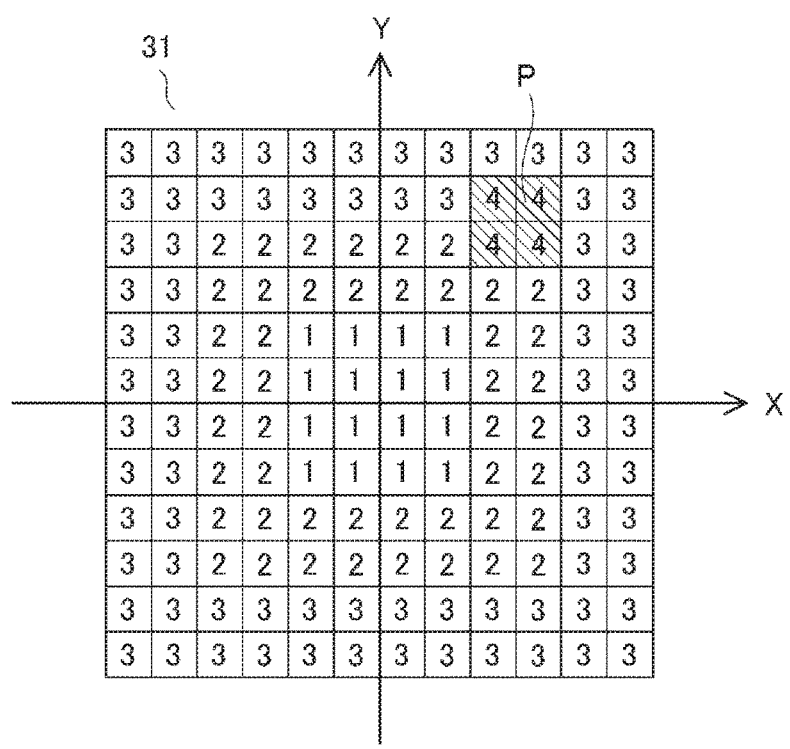
FIG. 4 is a diagram showing a transmission output correction table for the inter-vehicle communication device according to the first embodiment of the invention.

FIG. 4 shows one example of a transmission output correction table. The transmission output correction table 31 shown in FIG. 4 is such that a correction factor with respect to a transmission power reference value is set so as to correspond to a region with coordinates having the direction of travel of the own vehicle 100A as an axis. The transmission output correction table 31 is such that a corrected value is set so as to obtain a transmission power greater than transmission power in accordance with an inter-vehicle distance for the region P in which the radio wave propagation characteristics are sparse, and excepting the region P in which the radio wave propagation characteristics are sparse, transmission power in accordance with the inter-vehicle distance is set as transmission power necessary and sufficient for communication with the peripheral vehicle 100B positioned in a region with those coordinates.

Although the correction factor is set as an integer in FIG. 4, the correction factor is not limited to this. Also, in FIG. 4, the correction factor is set so that, except in the region P in which the radio wave propagation characteristics are sparse, transmission power increases uniformly in an X axis positive direction and negative direction and in a Y axis positive direction and negative direction, with the own vehicle 100A as an origin, but a ratio of increase of the correction factor may be changed between the X direction and the Y direction, or between the positive Y direction and the negative Y direction.

Figure 5:
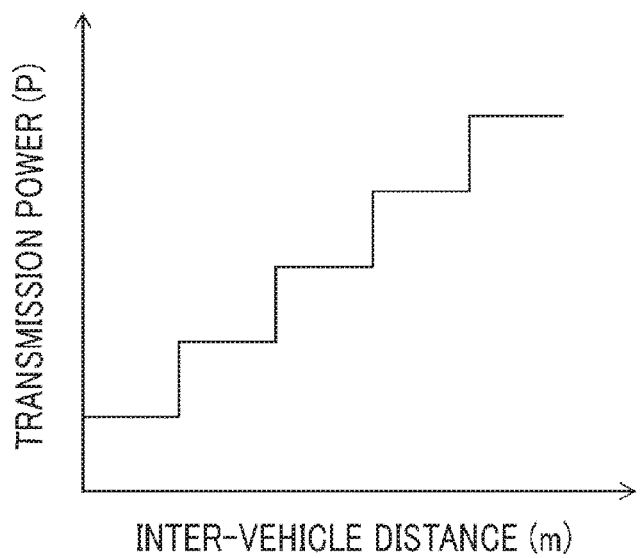
FIG. 5 is a correlation diagram of transmission power and inter-vehicle distance for the inter-vehicle communication device according to the first embodiment of the invention.

FIG. 5 is a correlation diagram of transmission power and inter-vehicle distance for the inter-vehicle communication device according to the first embodiment, wherein a vertical axis is transmission power (P), and a horizontal axis is inter-vehicle distance (m). The transmission output correction table 31 shown in FIG. 4 is such that the correction factor is set so that transmission power is gradually increased together with an increase in inter-vehicle distance, based on the correlation diagram shown in FIG. 5. The correction factor may also be set so that transmission power is continuously increased together with an increase in inter-vehicle distance, as in a correlation diagram shown in FIG. 6.

Also, the transmission output correction table 31 is such that of regions in which radio wave propagation characteristics are sparse, a region such that there is no need to communicate with a vehicle travelling in the region is taken to be an exception region (omitted from the drawing), and a corrected value is set so that transmission power equal to or less than transmission power in accordance with inter-vehicle distance is obtained. Peripheral vehicle travelling information transmitted from the peripheral vehicle 100B is utilized in an application of safe driving support, or the like, mounted in the own vehicle 100A, but, for example, a vehicle travelling in a region directly beside and far from the own vehicle 100A is not an object of a collision alarm. As there is no need to communicate with a peripheral vehicle travelling in this kind of region, the region is taken to be an exception region.

Also, when the relative position coordinate recording means 6 records the relative position coordinates of a multiple of peripheral vehicles, the transmission output regulating means 32 determines a transmission power for each of the multiple of relative position coordinates acquired from the relative position coordinate recording means 6, and employs maximum values of the multiple of transmission powers. Because of this, communication is established even with the peripheral vehicle of the multiple of peripheral vehicles positioned in the region in which the radio wave propagation characteristics are the sparsest.

Figure 7:
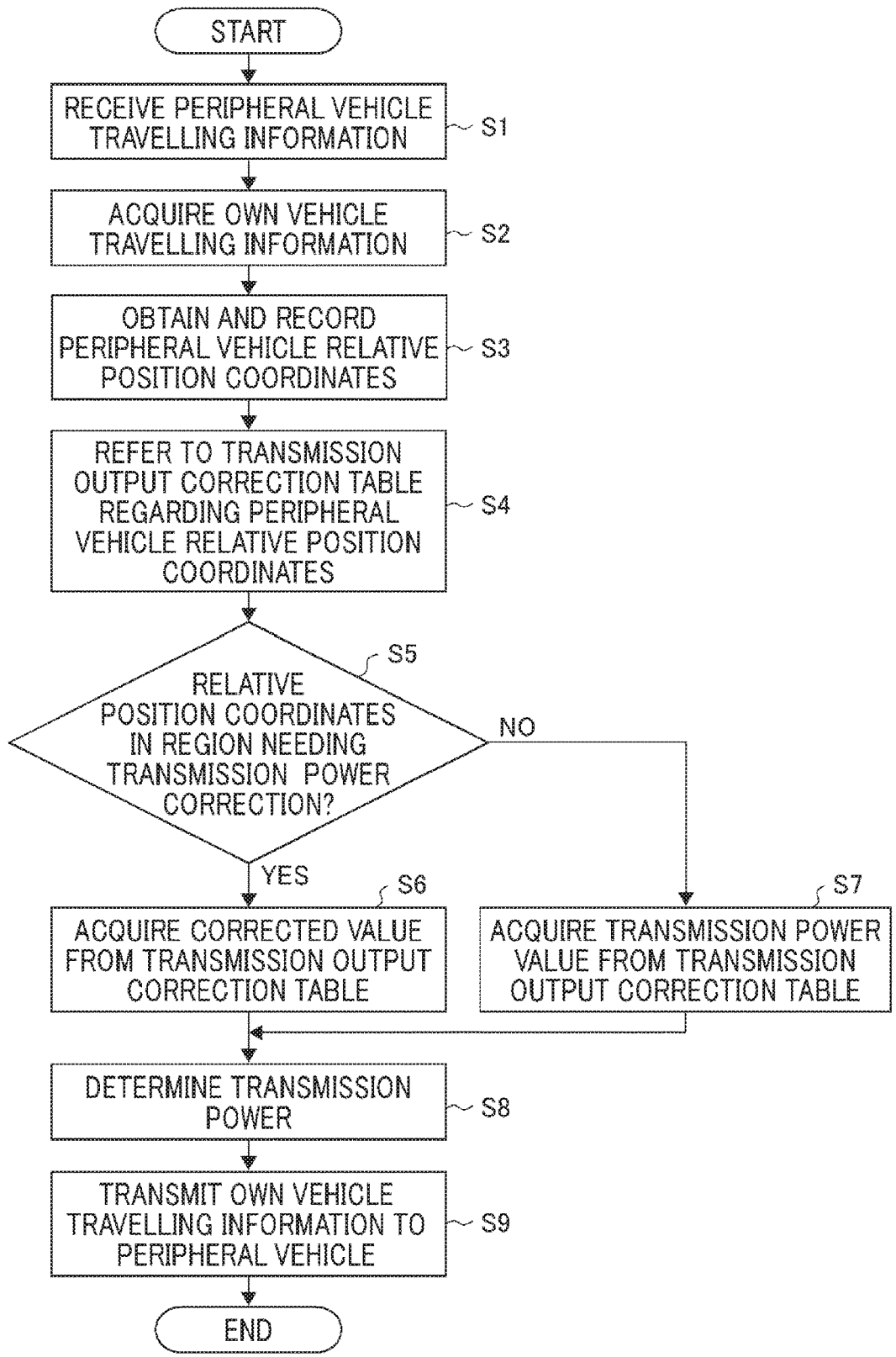
FIG. 7 is a diagram showing a flow of a process according to the inter-vehicle communication device according to the first embodiment of the invention.

A flow of a process according to the inter-vehicle communication device 1 according to the first embodiment will be described, using a flowchart of FIG. 7. FIG. 7 shows a flow of a process according to the inter-vehicle communication device 1 of the own vehicle 100A. In step S1, the receiving means 4 receives peripheral vehicle travelling information transmitted from the peripheral vehicle 100B. At least the current position (latitude and longitude) and the direction of travel of the peripheral vehicle 100B are included in the peripheral vehicle travelling information.

Continuing, in step S2, the relative position coordinate calculating means 5 acquires own vehicle travelling information including the current position (latitude and longitude) and the direction of travel of the own vehicle 100A output by the position detecting means 2. Continuing, in step S3, the relative position coordinates of the peripheral vehicle 100B among coordinates having the direction of travel of the own vehicle 100A as an axis are obtained based on the peripheral vehicle travelling information and the own vehicle travelling information, and recorded in the relative position coordinate recording means 6.

Continuing, in step S4, the transmission output regulating means 32 refers to the transmission output correction table 31 regarding the relative position coordinates of the peripheral vehicle 100B acquired from the relative position coordinate recording means 6. When a result of the reference is that the relative position coordinates of the peripheral vehicle 100B are in a region such that transmission power correction is needed (step S5: YES), a corrected value corresponding to the relative position coordinates is acquired from the transmission output correction table 31 in step S6.

Meanwhile, when the relative position coordinates of the peripheral vehicle 100B are not in a region such that transmission power correction is needed (step S5: NO), a transmission power value corresponding to the relative position coordinates is acquired from the transmission output correction table 31 in step S7. Continuing, transmission power is determined based on the acquired corrected value or transmission power value in step S8, and lastly, in step S9, own vehicle travelling information is transmitted to the peripheral vehicle 100B with the transmission power determined in step S8.

According to the inter-vehicle communication device 1 according to the first embodiment, as heretofore described, the inter-vehicle communication device 1 includes the transmission output correction table 31, wherein a transmission power value or a corrected transmission power value in accordance with propagation characteristics of radio waves transmitted from the own vehicle 100A is set to correspond to a region with coordinates having the direction of travel of the own vehicle 100A as an axis, and the transmission output regulating means 32 acquires a transmission power value or a corrected transmission power value corresponding to the relative position coordinates of the peripheral vehicle 100B from the transmission output correction table 31, and determines transmission power for when transmitting own vehicle travelling information to the peripheral vehicle 100B, because of which communication with the peripheral vehicle 100B positioned in the region P, in which radio wave propagation characteristics are sparse, can be reliably established.

Also, with regard to the peripheral vehicle 100B positioned in a region other than the region P in which radio wave propagation characteristics are sparse, transmission power necessary and sufficient for communication, that is, transmission power in accordance with inter-vehicle distance, is obtained, whereby communication congestion can be avoided. Also, a region such that there is no need to communicate with a vehicle travelling in the region, for example, a region that has no possibility of being utilized in an application, is taken to be an exception region, even when the region is a region in which radio wave propagation characteristics are sparse, whereby transmission power being set high for unnecessary communication can be avoided.

Second Embodiment

Figure 8:
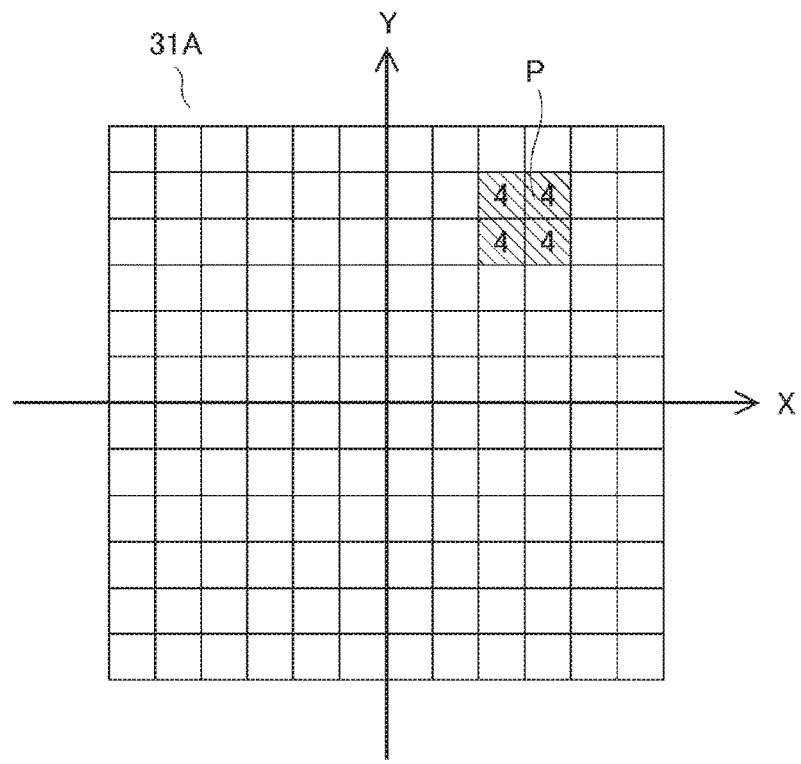
FIG. 8 is a diagram showing a transmission output correction table for an inter-vehicle communication device according to a second embodiment of the invention.

As an overall configuration of an inter-vehicle communication device according to a second embodiment of the invention is the same as in the first embodiment, FIG. 1 will be utilized, and a description of each function will be omitted. FIG. 8 shows a transmission output correction table of the inter-vehicle communication device according to the second embodiment. The transmitting means 3 of the inter-vehicle communication device 1 according to the second embodiment has a correlation diagram in which transmission power in accordance with inter-vehicle distance is set, in addition to a transmission output correction table 31A shown in FIG. 8 and the transmission output regulating means 32.

Figure 6:
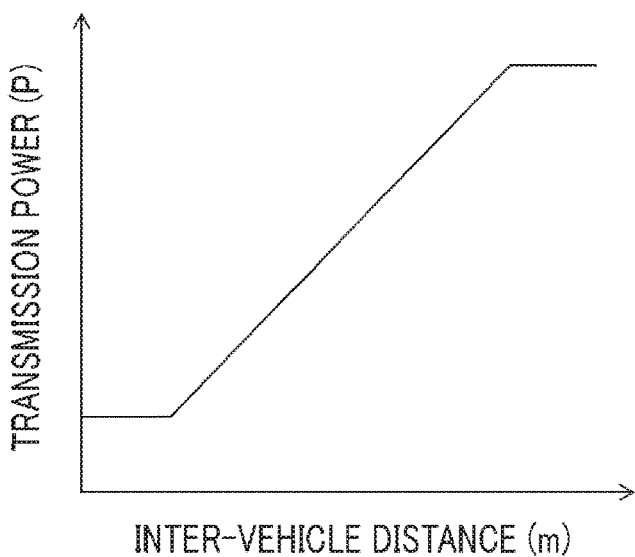
FIG. 6 is a correlation diagram of transmission power and inter-vehicle distance for the inter-vehicle communication device according to the first embodiment of the invention.

In the transmission output correction table 31 of the inter-vehicle communication device 1 according to the first embodiment (refer to FIG. 4), a corrected transmission power value is set for the region P, in which radio wave propagation characteristics are sparse, and a transmission power value in accordance with inter-vehicle distance is set for other regions. As opposed to this, only a corrected transmission power value for the region P, in which radio wave propagation characteristics are sparse, is set in the transmission output correction table 31A of the inter-vehicle communication device 1 according to the second embodiment, and transmission power values for other regions are obtained from the correlation diagram in which transmission power in accordance with inter-vehicle distance is set. FIG. 5 or FIG. 6 described in the first embodiment are proposed as examples of a correlation diagram in which transmission power in accordance with inter-vehicle distance is set, but the correlation diagram is not limited to these.

The transmission output regulating means 32 refers to the transmission output correction table 31A shown in FIG. 8 regarding the relative position coordinates of the peripheral vehicle 100B acquired from the relative position coordinate recording means 6. When the relative position coordinates in question are in a region such that transmission power correction is needed, transmission power is determined based on the corrected value set in the transmission output correction table 31A.

Meanwhile, when the relative position coordinates in question are in a region such that transmission power correction is not needed, inter-vehicle distance is obtained from the relative position coordinates of the peripheral vehicle 100B, and transmission power is determined by referring to the correlation diagram in which transmission power in accordance with inter-vehicle distance is set. The same advantages as in the first embodiment are obtained in the second embodiment.

Third Embodiment

Figure 9:
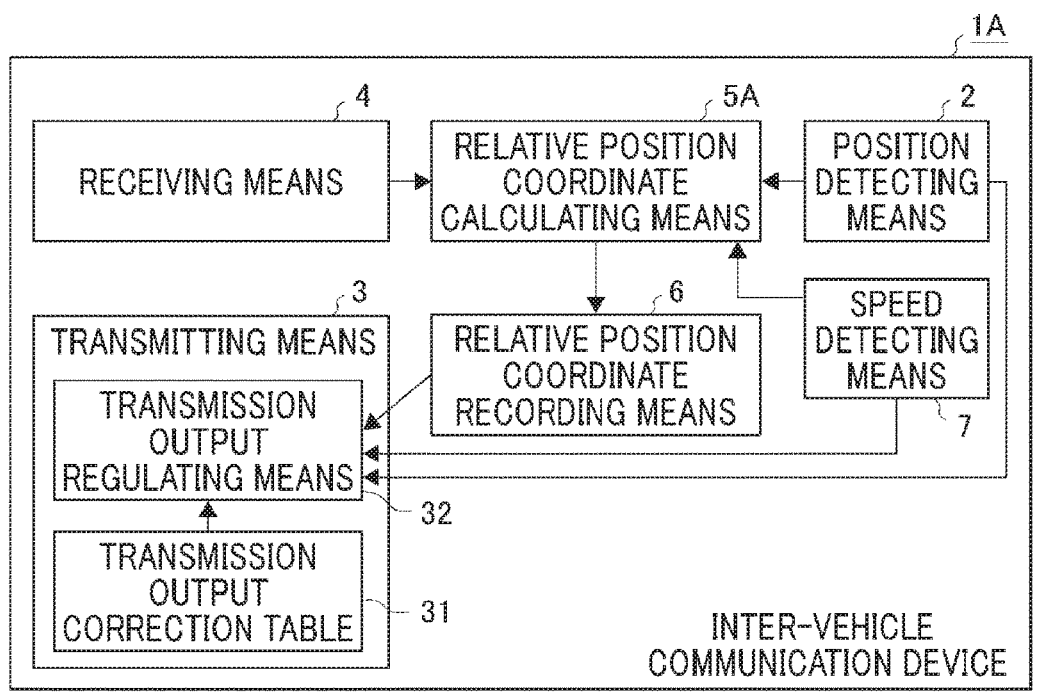
FIG. 9 is a functional block diagram showing an inter-vehicle communication device according to a third embodiment of the invention.

FIG. 9 is a functional block diagram showing an inter-vehicle communication device according to a third embodiment of the invention. In FIG. 9, the same reference signs are allotted to portions identical to or corresponding to portions in FIG. 1, and a description of each function will be omitted. In the first embodiment and the second embodiment, the relative position coordinate calculating means 5 obtains the relative position coordinates of the peripheral vehicle 100B using the latitude and the longitude of the peripheral vehicle 100B, and the latitude, the longitude, and the direction of travel of the own vehicle 100A.

As opposed to this, an inter-vehicle communication device 1A according to the third embodiment includes the speed detecting means 7 as the speed detector that detects vehicle speed, and own vehicle travelling information transmitted to the peripheral vehicle 100B includes the latitude, the longitude, the direction of travel, and the speed of the own vehicle 100A. Also, peripheral vehicle travelling information received by the receiving means 4 includes the latitude, the longitude, the direction of travel, and the speed of the peripheral vehicle 100B. Although an existing speed sensor can be used as the speed detecting means 7, speed can also be detected by the position detecting means 2, which utilizes a satellite positioning system.

Relative position coordinate calculating means 5A in the third embodiment obtains estimated latitude and longitude of the peripheral vehicle 100B by adding a vector obtained by multiplying the direction of travel, the speed, and time needed for a communication process to the latitude and the longitude of the peripheral vehicle 100B included in the peripheral vehicle travelling information. Furthermore, the relative position coordinate calculating means 5A obtains the relative position coordinates of the peripheral vehicle 100B among coordinates having the direction of travel of the own vehicle 100A as an axis, based on the estimated latitude and longitude and the own vehicle travelling information.

Also, even when speed is not included in the peripheral vehicle travelling information received by the receiving means 4, the relative position coordinate calculating means 5A can obtain the speed of the peripheral vehicle 100B using the following method, and obtain the estimated latitude and longitude. When a peripheral vehicle travelling information reception cycle is within a predetermined time interval, the relative position coordinate calculating means 5A obtains the direction of travel and the speed of the peripheral vehicle 100B by multiplying a difference between immediately preceding values and current values of the latitude and the longitude of the peripheral vehicle 100B by the reception cycle time interval. Subsequently, in the same way, the relative position coordinate calculating means 5A can obtain the estimated latitude and longitude of the peripheral vehicle 100B by adding a vector obtained by multiplying the direction of travel, the speed, and the time needed for the communication process to the current values of the latitude and the longitude of the peripheral vehicle 100B.

According to the third embodiment, in addition to the same advantages as in the first embodiment, deviation between an actual current position of the peripheral vehicle 100B and a current position transmitted from the peripheral vehicle 100B, which occurs due to a communication delay, can be corrected. Because of this, accuracy of relative position coordinates of the peripheral vehicle 100B inquired of in the transmission output correction table 31 increases, and more appropriate transmission power regulation can be carried out. The embodiments of the invention can be freely combined, and each embodiment can be modified or abbreviated as appropriate, without departing from the scope of the invention.

What is claimed is:

1. An inter-vehicle communication device mounted in a multiple of vehicles including an own vehicle and a peripheral vehicle and carrying out wireless communication between the own vehicle and the peripheral vehicle, the inter-vehicle communication device comprising:

a position detector that detects a current position and a direction of travel of the own vehicle;

a transmitting device that transmits own vehicle travelling information including the current position and the direction of travel of the own vehicle output by the position detector to the peripheral vehicle;

a receiving device that receives peripheral vehicle travelling information including a current position and a direction of travel of the peripheral vehicle; and a processing circuit having a transmission output correction table in which a transmission power value or a corrected transmission power value in accordance with propagation characteristics of radio waves transmitted from the own vehicle is set to correspond to a region with coordinates having the direction of travel of the own vehicle as an axis, wherein the processing circuit to obtain relative position coordinates of the peripheral vehicle among coordinates having the direction of travel of the own vehicle as an axis, based on the own vehicle travelling information and the peripheral vehicle travelling information, to record the relative position coordinates, to acquire a transmission power value or a corrected transmission power value corresponding to the relative position coordinates from the transmission output correction table, and to determine transmission power for when transmitting the own vehicle travelling information to the peripheral vehicle.

2. The inter-vehicle communication device according to claim 1, wherein the processing circuit obtains the relative position coordinates of the peripheral vehicle using a latitude and a longitude of the peripheral vehicle and a latitude, a longitude, and a direction of travel of the own vehicle.

3. The inter-vehicle communication device according to claim 1, comprising a speed detector that detects vehicle speed, wherein the own vehicle travelling information includes a latitude, a longitude, a direction of travel, and a speed of the own vehicle and the peripheral vehicle travelling information includes a latitude, a longitude, a direction of travel, and a speed of the peripheral vehicle, and the processing circuit obtains estimated latitude and longitude of the peripheral vehicle by adding a vector obtained by multiplying the direction of travel, the speed, and time needed for a communication process to the latitude and the longitude of the peripheral vehicle, and obtains the relative position coordinates of the peripheral vehicle using the estimated latitude and longitude.

4. The inter-vehicle communication device according to claim 1, wherein, when a reception cycle of the peripheral vehicle travelling information is within a predetermined time interval, the processing circuit obtains a direction of travel and a speed of the peripheral vehicle by multiplying a difference between immediately preceding values and current values of a latitude and a longitude of the peripheral vehicle by the reception cycle time interval, obtains an estimated latitude and longitude of the peripheral vehicle by adding a vector obtained by multiplying the direction of travel, the speed, and time needed for a communication process to the latitude and the longitude of the peripheral vehicle, and obtains the relative position coordinates of the peripheral vehicle using the estimated latitude and longitude.

5. The inter-vehicle communication device according to claim 1, wherein the transmission output correction table is such that a corrected value is set so that transmission power greater than transmission power in accordance with inter-vehicle distance is obtained for a region in which radio wave propagation characteristics are sparse.

6. The inter-vehicle communication device according to claim 5, wherein the transmission output correction table is such that of regions in which radio wave propagation characteristics are sparse, a region such that there is no need to communicate with a vehicle travelling in the region is taken to be an exception region, and a corrected value is set so that transmission power equal to or less than transmission power in accordance with inter-vehicle distance is obtained for the exception region.

7. The inter-vehicle communication device according to claim 5, wherein the transmission output correction table is such that a transmission power value in accordance with inter-vehicle distance is set, except for a region in which radio wave propagation characteristics are sparse.

8. The inter-vehicle communication device according to claim 1, wherein
the processing circuit has a correlation diagram in which transmission power in accordance with inter-vehicle distance is set, refers to the transmission output correction table regarding the relative position coordinates, acquires a corrected transmission power value from the transmission output correction table when the relative position coordinates are in a region such that transmission power correction is needed, and acquires a transmission power value in accordance with inter-vehicle distance by referring to the correlation diagram when the relative position coordinates are in a region such that transmission power correction is not needed.

9. The inter-vehicle communication device according to claim 1, wherein the processing circuit can record relative position coordinates of a multiple of peripheral vehicles, determines transmission power for each of a multiple of the relative position coordinates, and employs maximum values of the multiple of transmission powers.

* * * * *